Oct. 17, 1939.                F. D. PALMER                 2,176,147
           METHOD AND APPARATUS FOR FORMING AND FILLING CARTONS
                 Filed Oct. 4, 1937         13 Sheets-Sheet 1

Inventor
Frank D. Palmer
By Williams, Bradbury,
McCall & Hinkle
Attys.

Oct. 17, 1939.  F. D. PALMER  2,176,147
METHOD AND APPARATUS FOR FORMING AND FILLING CARTONS
Filed Oct. 4, 1937  13 Sheets-Sheet 3
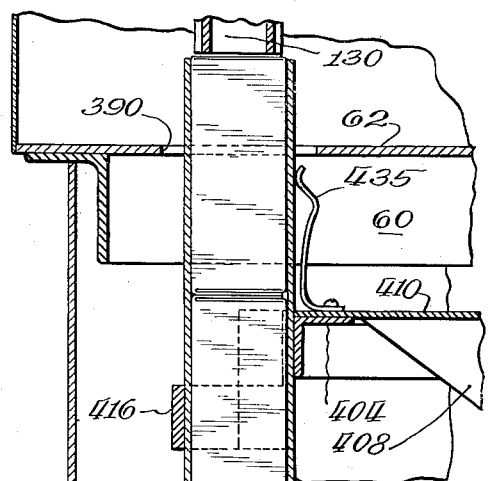
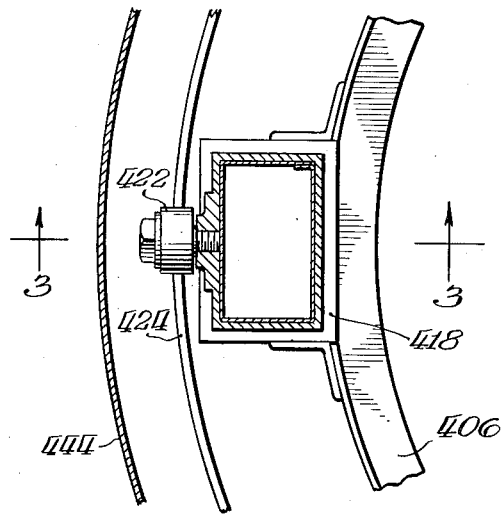
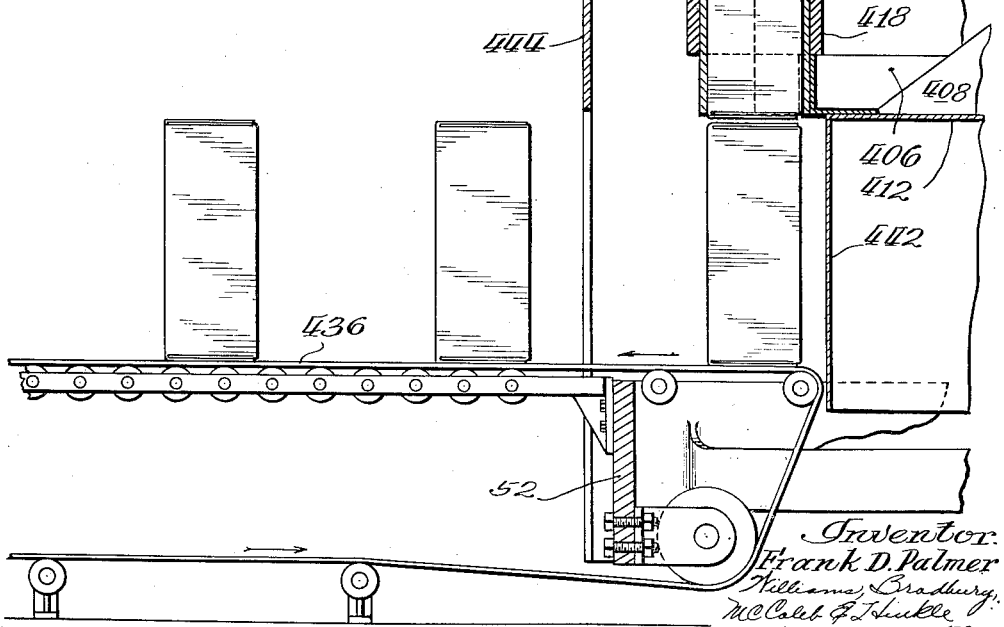

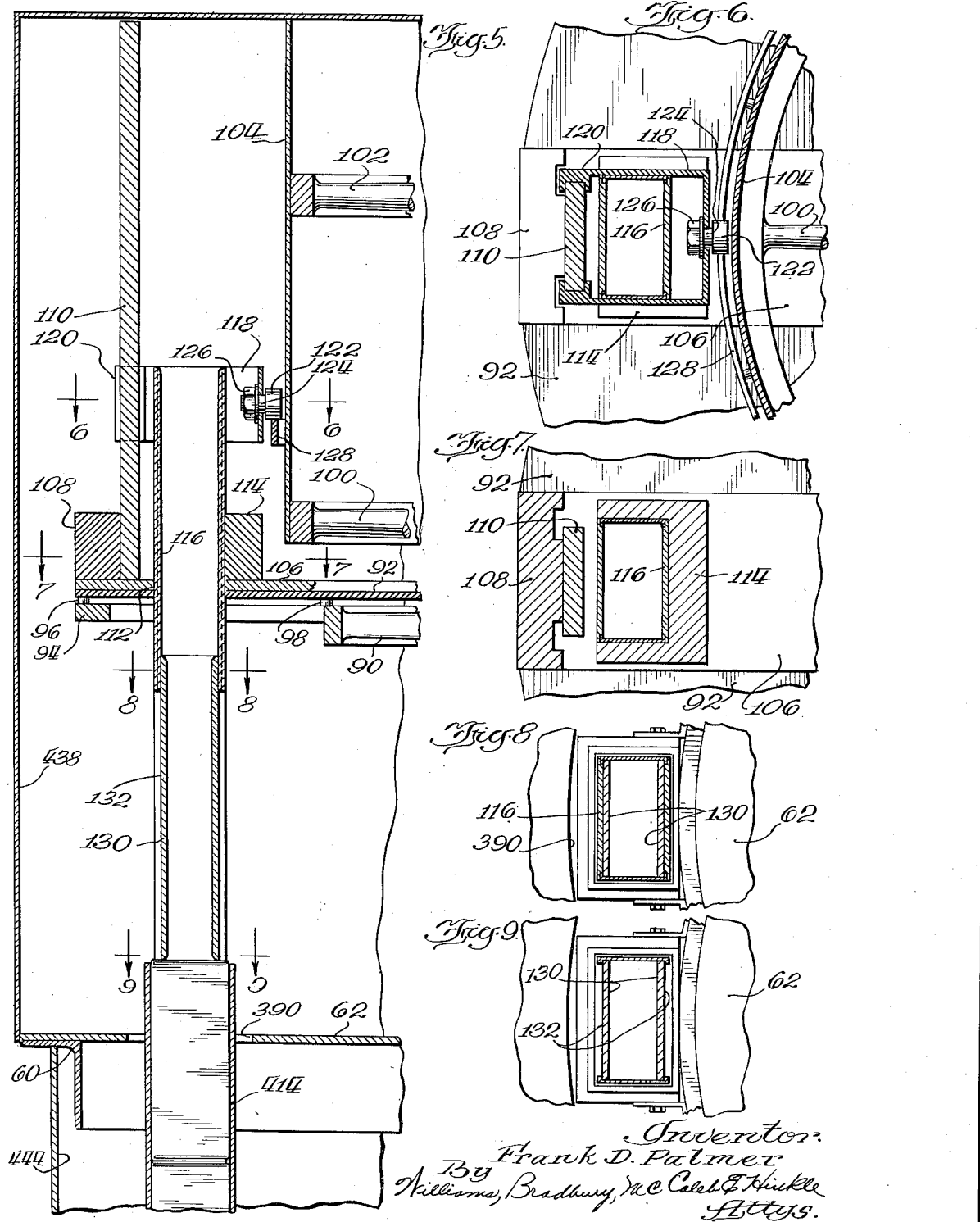

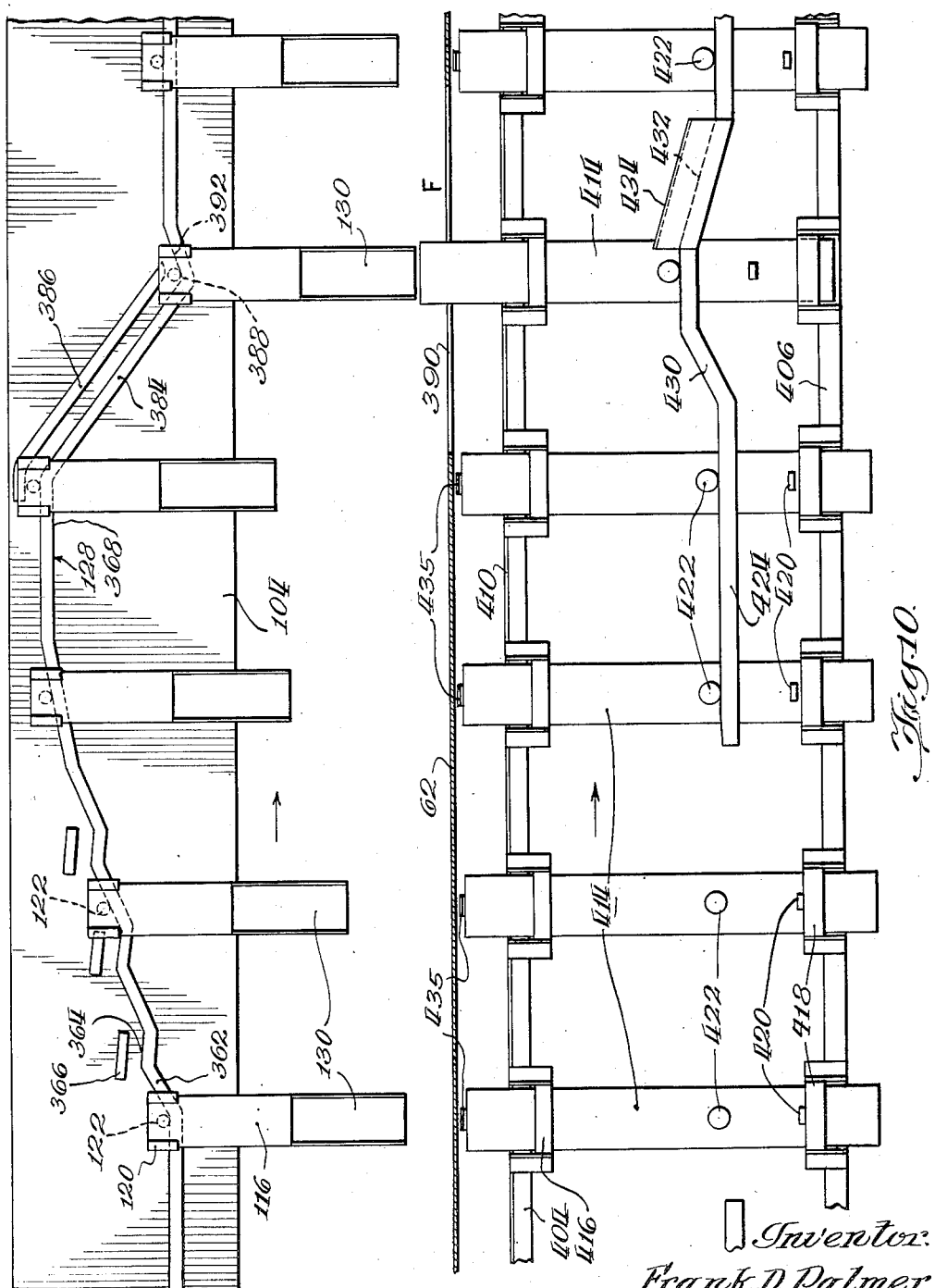

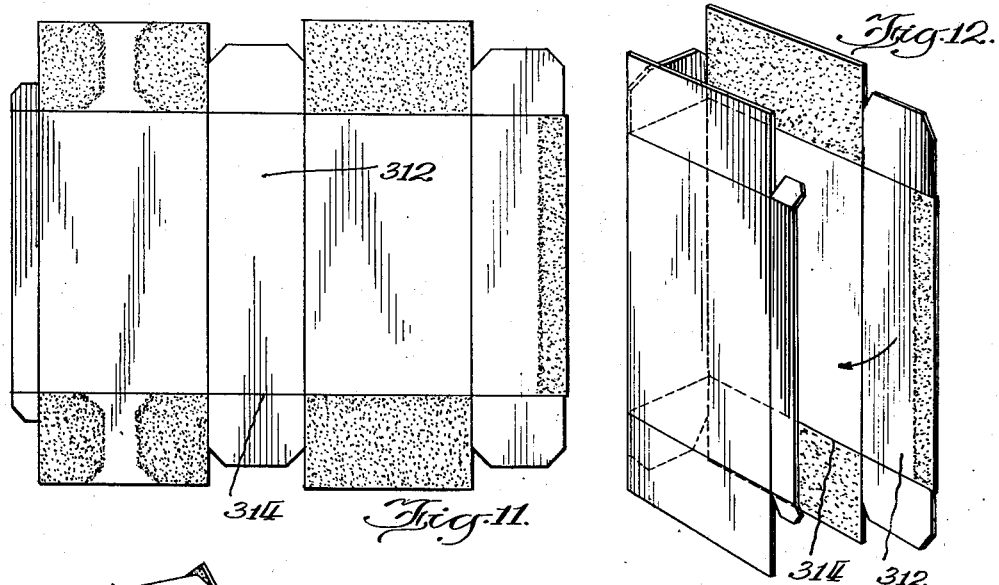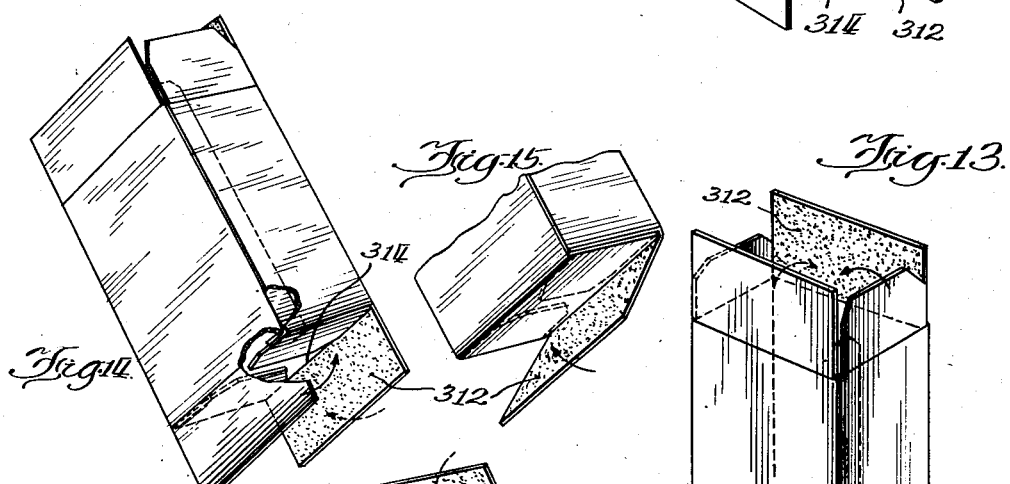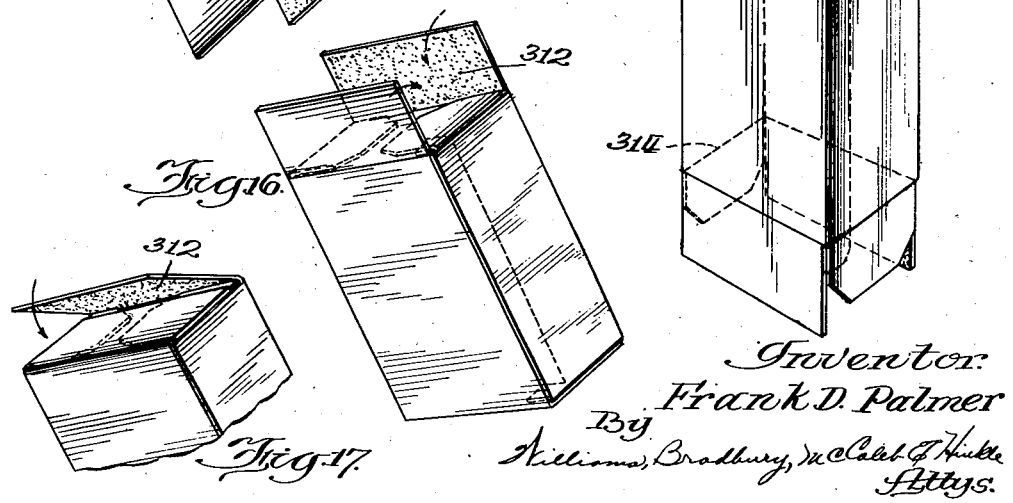

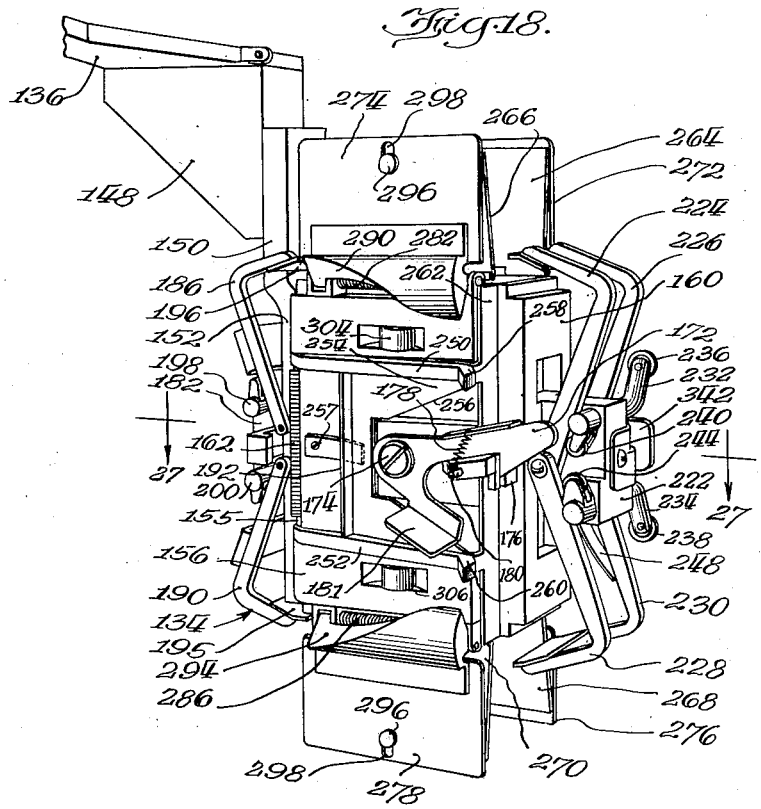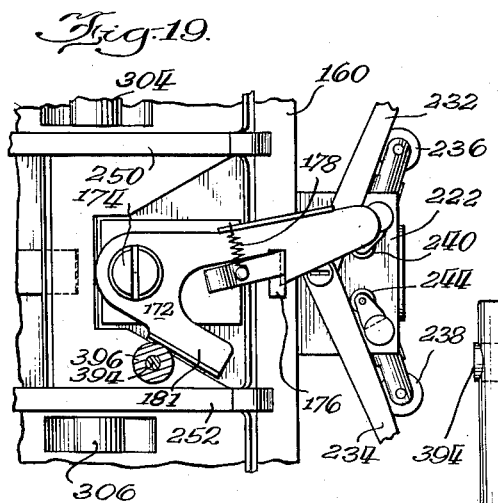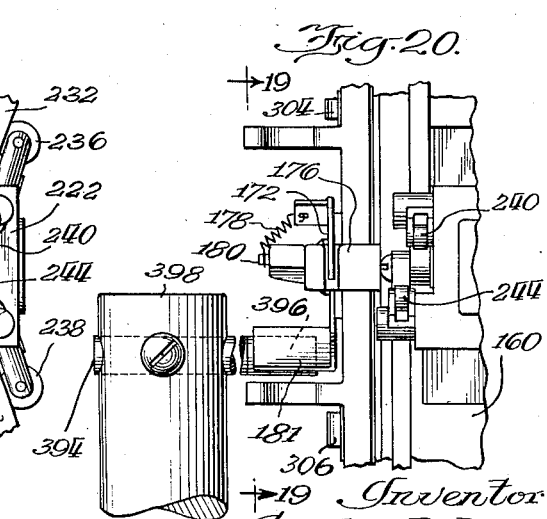

Oct. 17, 1939.   F. D. PALMER   2,176,147
METHOD AND APPARATUS FOR FORMING AND FILLING CARTONS
Filed Oct. 4, 1937   13 Sheets-Sheet 8
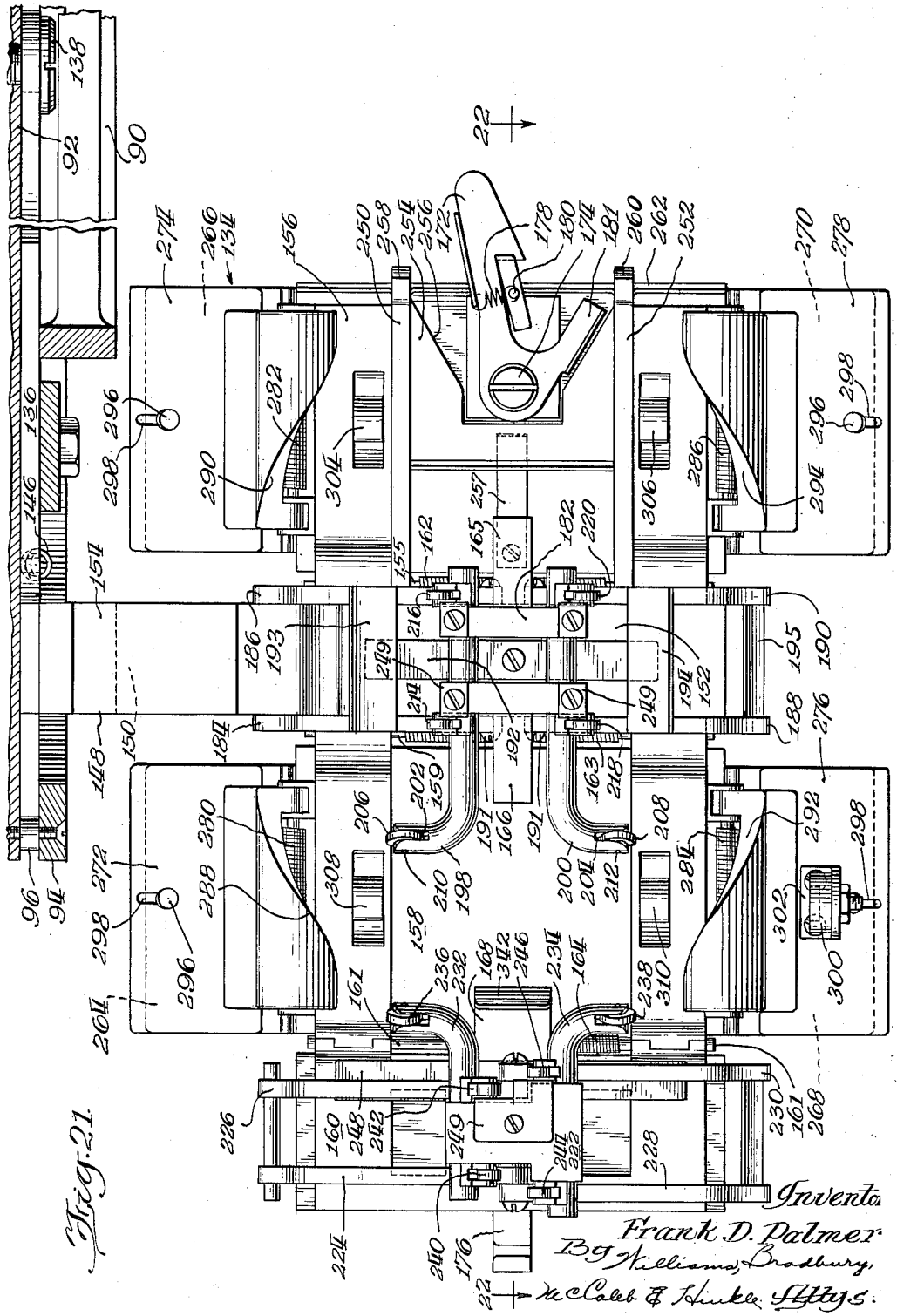

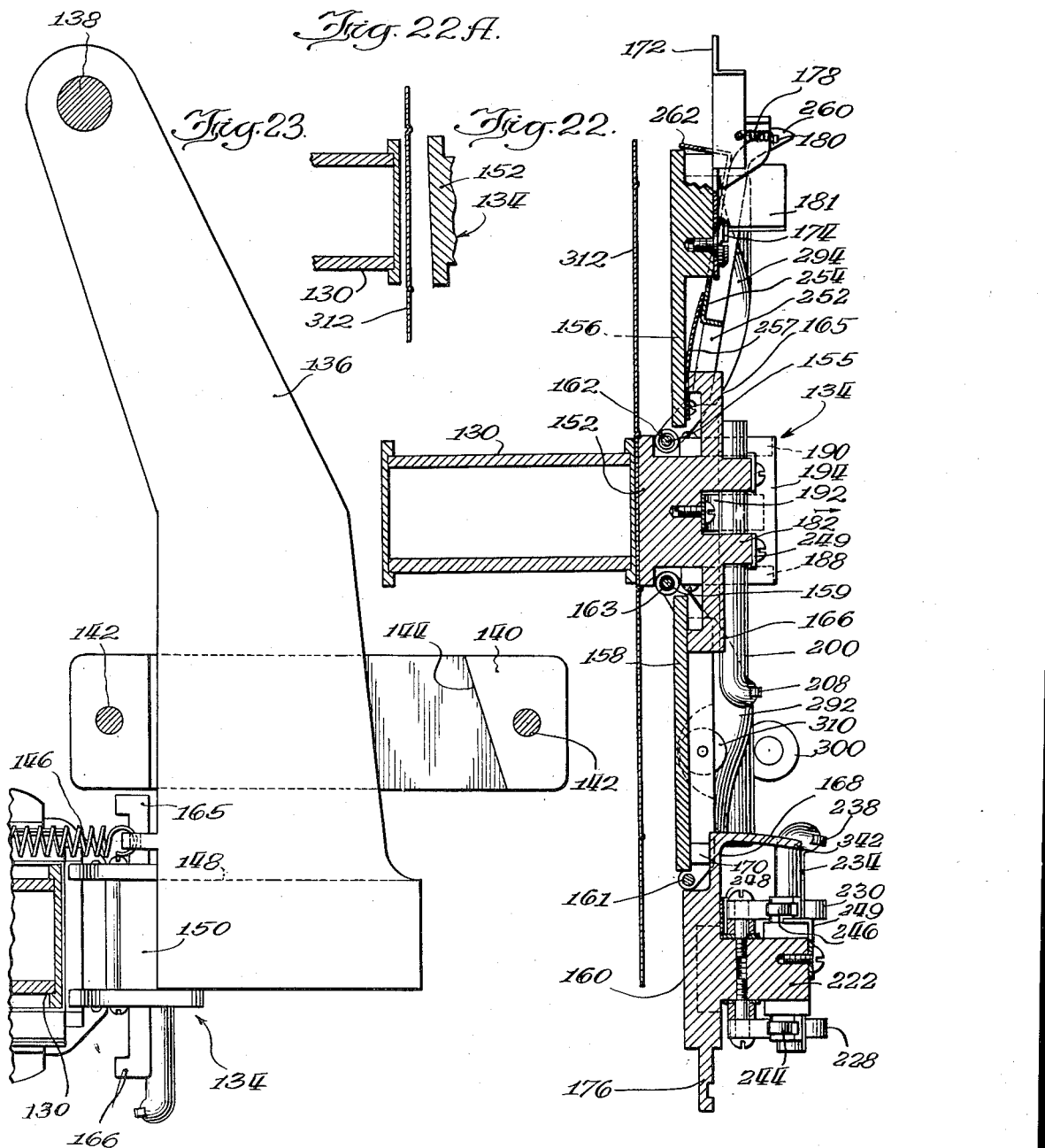

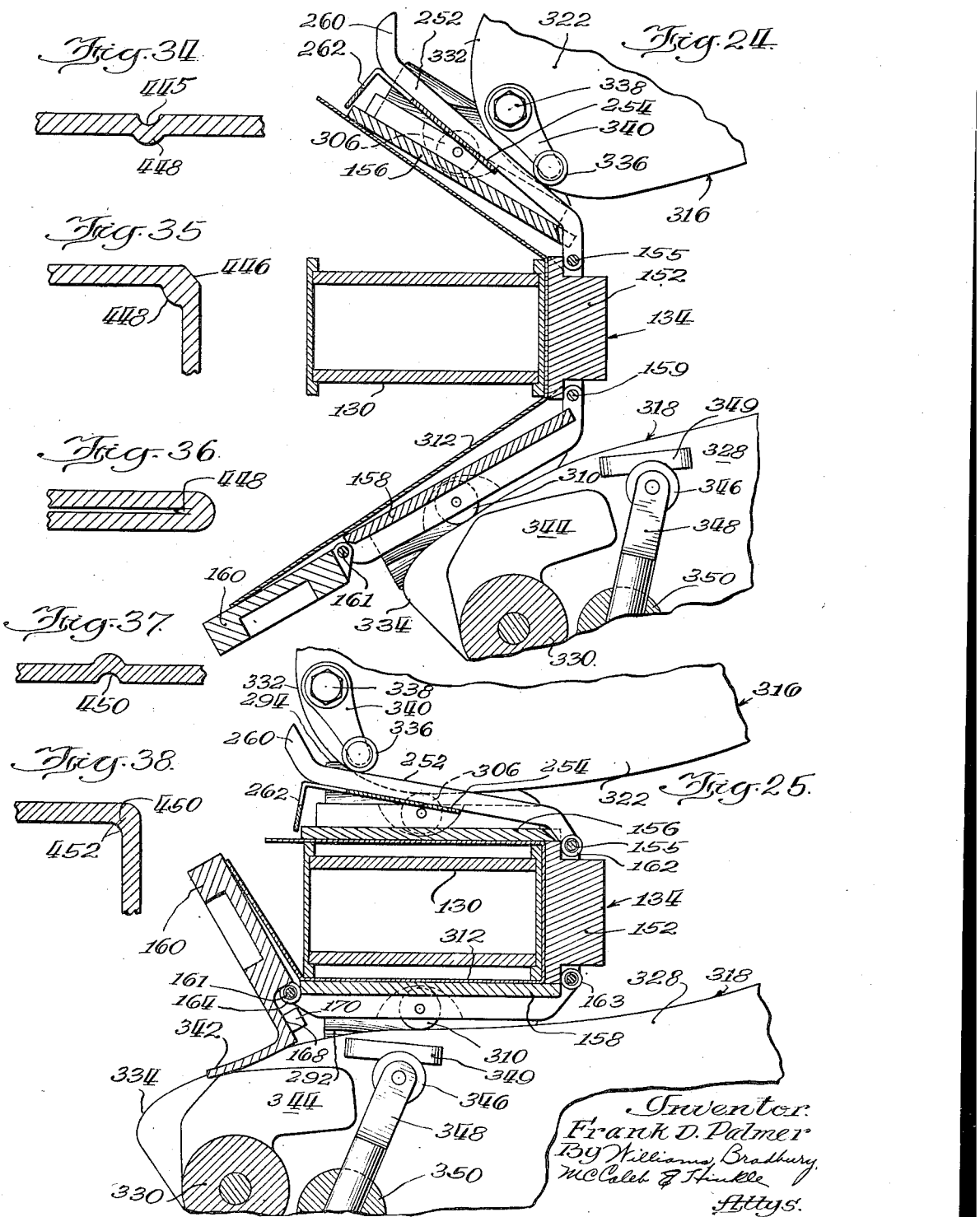

Oct. 17, 1939.   F. D. PALMER   2,176,147
METHOD AND APPARATUS FOR FORMING AND FILLING CARTONS
Filed Oct. 4, 1937   13 Sheets-Sheet 11
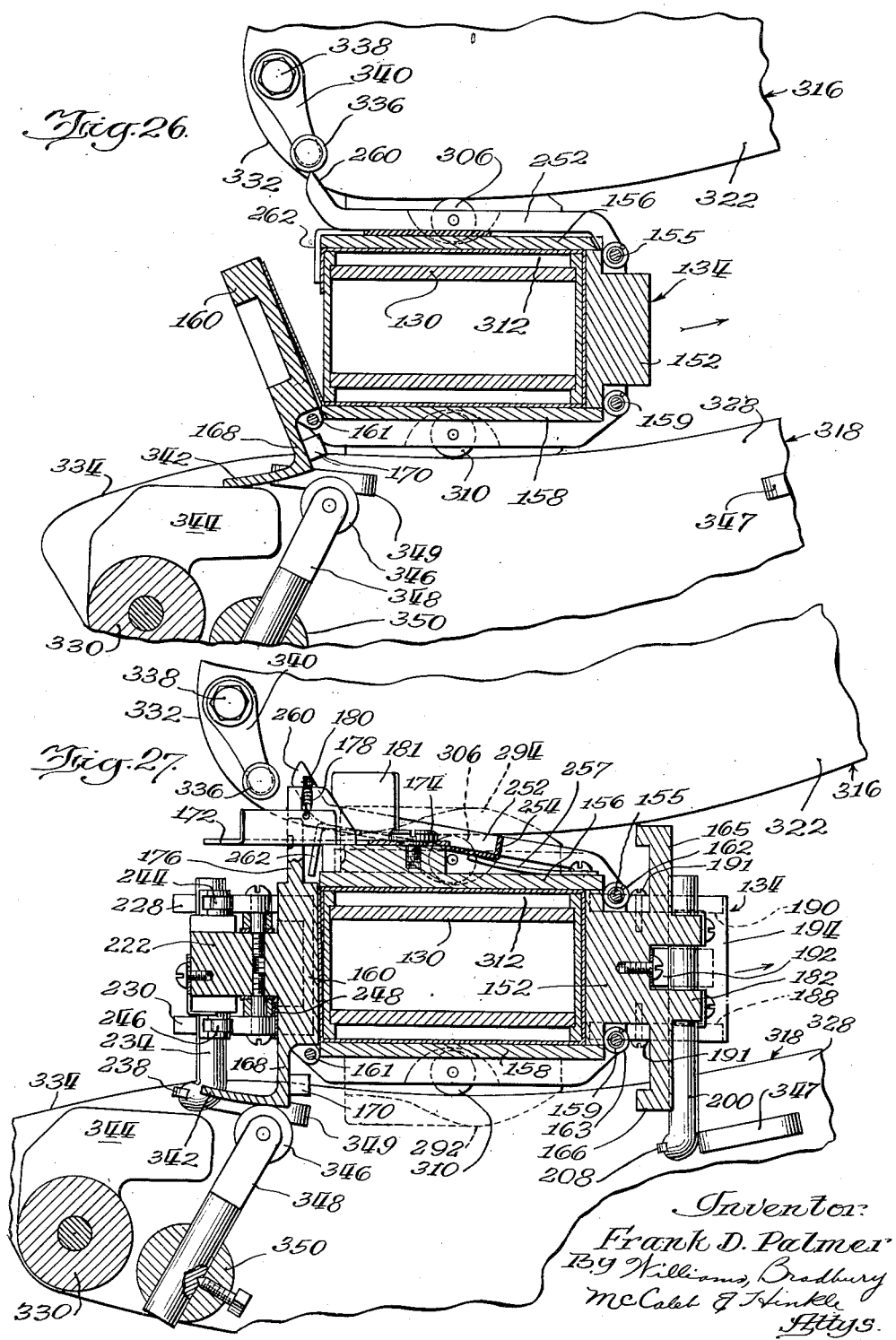
Inventor:
Frank D. Palmer
By Williams, Bradbury
McCaleb & Hinkle
Attys.

Oct. 17, 1939.   F. D. PALMER   2,176,147
METHOD AND APPARATUS FOR FORMING AND FILLING CARTONS
Filed Oct. 4, 1937   13 Sheets-Sheet 12
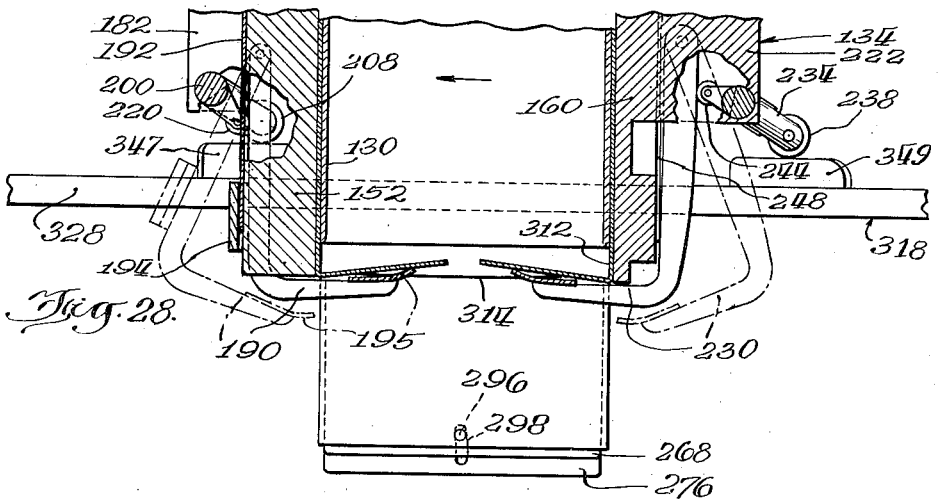
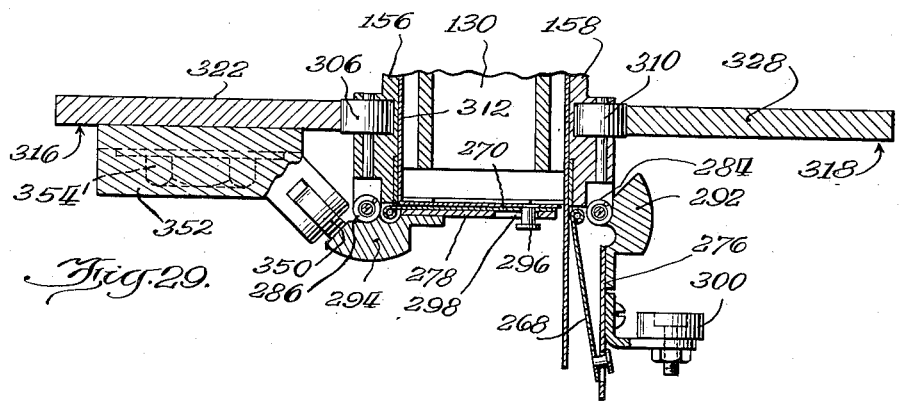
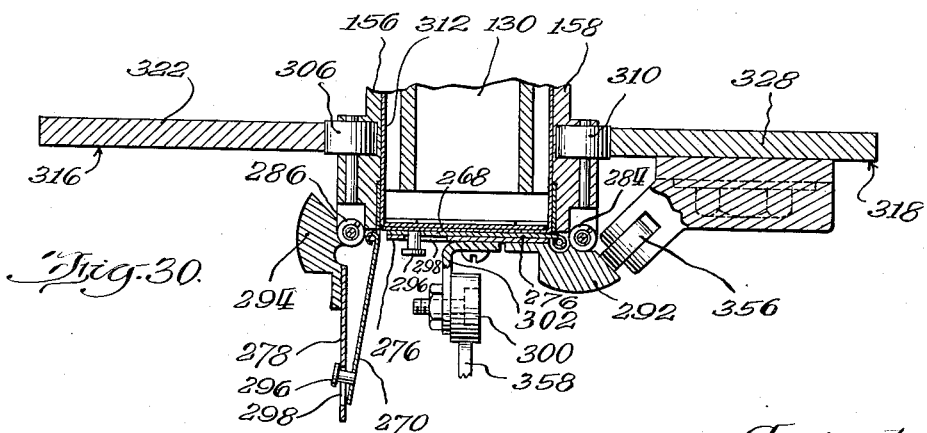
Inventor:
Frank D. Palmer
By Williams, Bradbury, McCaleb & Hinkle
Attys.

Oct. 17, 1939.  F. D. PALMER  2,176,147
METHOD AND APPARATUS FOR FORMING AND FILLING CARTONS
Filed Oct. 4, 1937   13 Sheets-Sheet 13
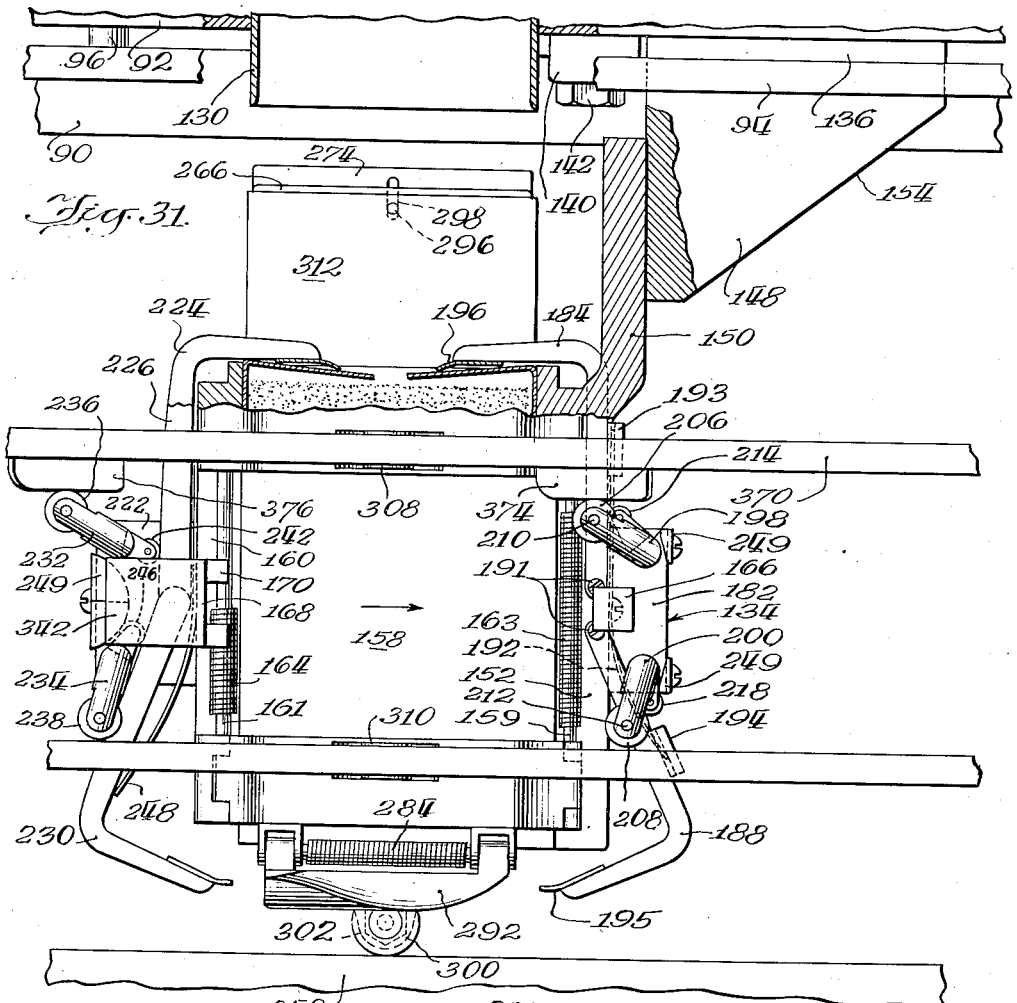
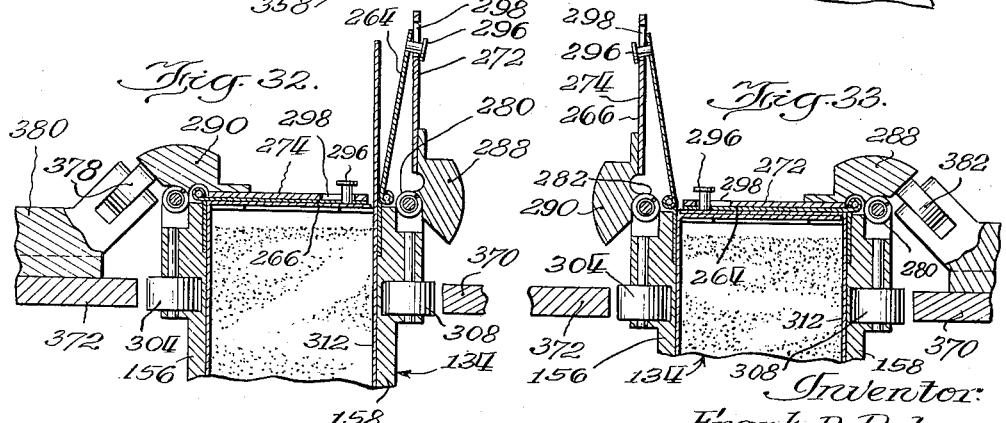
Inventor:
Frank D. Palmer
By Williams, Bradbury, McCaleb & Hinkle
Attys.

Patented Oct. 17, 1939

2,176,147

UNITED STATES PATENT OFFICE 2,176,147

METHOD AND APPARATUS FOR FORMING AND FILLING CARTONS

Frank D. Palmer, Chicago, Ill., assignor of one-third to Cranston Spray and one-third to Oliver P. Kline, both of Chicago, Ill.

Application October 4, 1937, Serial No. 167,153

35 Claims. (Cl. 93—3)

My invention contemplates and provides a novel and advantageous machine and method for forming and filling cardboard cartons of the type used for packaging soap granules, salt, cereals, or similar products.

In the past it has been customary for the packager to receive cartons in the form of a tube with the side seam already glued, and the tube folded flat. These tubes are then opened and the lower flaps folded across the bottom and glued together. The carton is then filled and the top flaps folded into place and sealed. After the top flaps are sealed, the carton usually is passed between two conveyor belts which hold the flaps in place while the glue sets.

The above operations, as ordinarily performed, necessitate the installation of several machines which occupy considerable floor space and are expensive in operation.

It is a salient object of the present invention to provide a novel method and machine in which flat cardboard blanks are automatically folded into tubes, the side seam glued, the bottom flaps folded and glued into place, the carton filled, the top flaps folded and secured in place, and the manufactured and filled carton retained under pressure until the glue sets, the finished carton ready for shipment then being ejected from the machine.

Another important object of the invention is to provide a novel, comparatively small and simple machine that manufactures, fills, seals, and sets the glue of cardboard cartons.

Another object is to provide a novel method and machine for forming less costly cartons having better glued joints and squarer corners than are produced by machines customarily used.

Another object is to provide a novel machine that manufactures, fills and seals cartons by continuous movement rather than by intermittent movement past a series of operating stations.

Another object is to provide a novel carton manufacturing, filling, and sealing machine that is fully automatic in operation.

Another object is to provide a novel carton machine having a hollow mandrel which serves as an internal forming member for the carton, a spout through which the carton is filled, and a ram for forcing the completed carton from the form.

These and other objects and advantages will become apparent during the course of the following description.

In the accompanying drawings, forming a part of this specification, and in which like numerals are employed to designate like parts throughout the same:

Fig. 3 is a vertical sectional view of the lower front portion of the machine, showing a conveyor to receive the completed cartons;

Fig. 4 is a horizontal transverse section, taken along the line 4—4 of Fig. 3;

Fig. 5 is a vertical sectional view, taken in the same plane as Fig. 3, showing the upper front portion of the machine;

Figure 1:
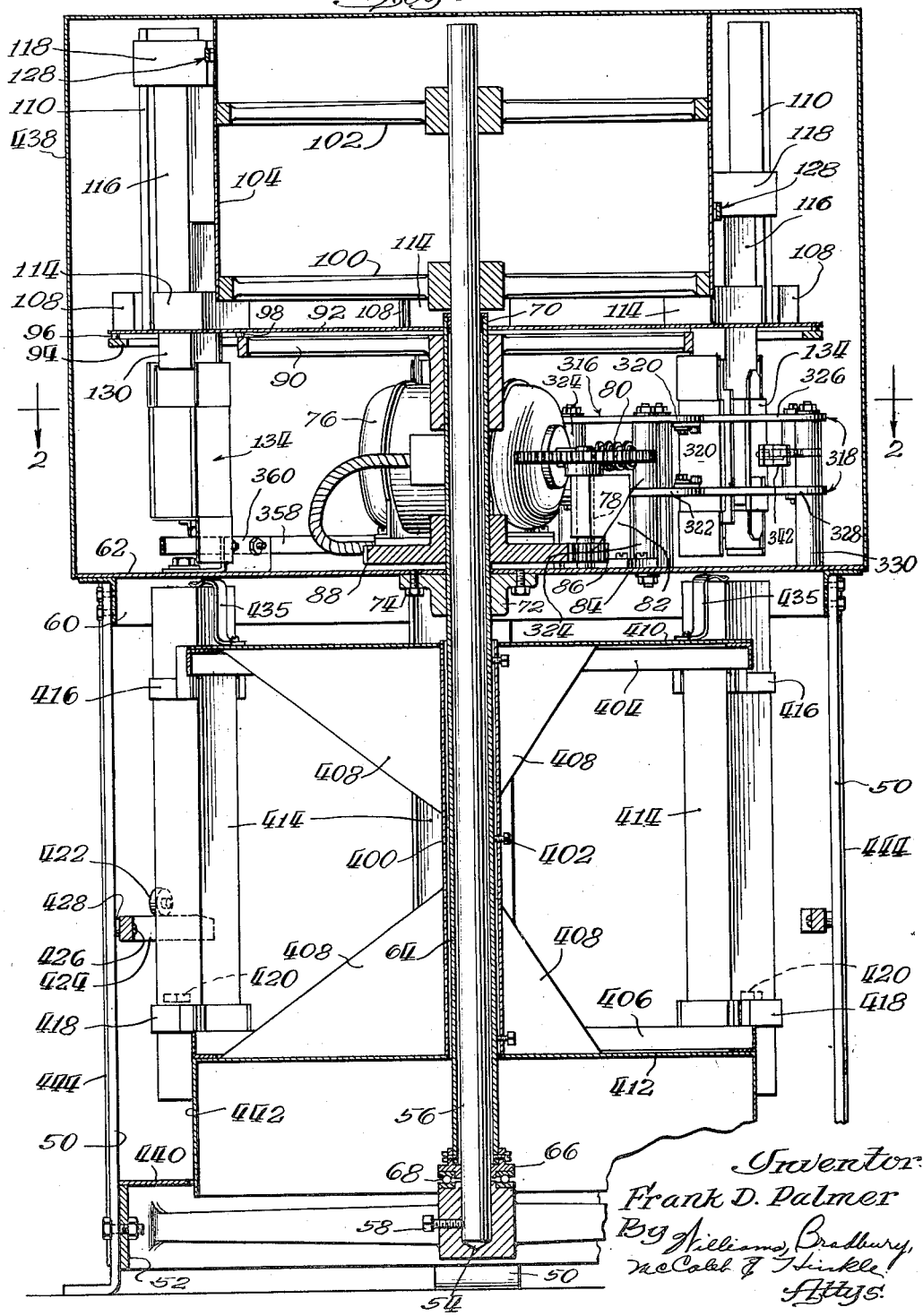
Fig. 1 is a vertical medial sectional view of a machine embodying the present invention, taken in the direction of the arrows along the line 1—1 of Fig. 2.

Figs. 6, 7, 8 and 9 are transverse sectional views, taken in the direction of the arrows along the lines 6—6, 7—7, 8—8, and 9—9, respectively, of Fig. 5;

Fig. 10 is a diagrammatic developed view of the machine showing the mandrels and stacks and their actuating cams;

Figs. 11 to 17 are perspective views illustrating progressively the manner in which a carton is formed in accordance with my invention, Fig. 11 illustrating a carton blank, and Fig. 17 illustrating a completed and sealed carton;

Fig. 18 is a perspective view of one of the carton folding heads, taken from near the center of the machine;

Fig. 19 is a back elevation of a fraction of one of the folding heads, illustrating in detail the latch and latch releasing mechanism;

Fig. 20 is a left side elevation of a fraction of one of the heads, illustrating in detail the latch and latch releasing mechanism;

Fig. 21 is a right side elevation of one of the heads shown in opened position;

Fig. 22 is a transverse sectional view of a head and mandrel, taken in the direction of the arrows along the line 22—22 of Fig. 21;

Fig. 22a is a fractional sectional view, similar to Fig. 22, excepting that here the head and mandrel are shown separated;

Fig. 23 is a plan view of a fraction of one of the heads illustrating the head mounting arm;

Figs. 24 to 33 are simplified sectional views illustrating progressively the movements of one of the heads during a carton forming and closing operation. Figs. 24 to 27 are transverse sectional views of the head looking downwardly, Fig. 28 is a vertical sectional view looking from inside the machine, Fig. 31 is a front elevation of the head, partly in section, while Figs. 29, 30, 32 and 33 are vertical sectional views looking in the direction of travel of the head;

Figs. 34 to 36 are detail views of a score and corner of cartons as ordinarily manufactured; and Figs. 37 and 38 are detail views of a score and corner of an alternative form of carton that may be made by a machine embodying the present invention.

In general, the machine is cylindrical and is provided with four legs 50 which support the structure. Near the bottom of the machine the legs 50 are bolted to the rim of a wheel-like casting 52. The central portion, or hub, of the wheel 52 is counterbored from the top at 53 to receive the lower end of a stationary shaft 56, which is secured rigidly in place by means of set screws 58. The shaft 56 extends substantially to the top of the machine and serves to support several of the machine's elements, as will appear shortly.

The upper ends of the legs 50, which extend slightly more than half the height of the machine, are bolted or otherwise suitably secured to an angle iron ring 60, the upper surface of which supports a circular table 62, and is bolted or welded thereto.

A tube 64 surrounds the shaft 56 for about three-fourths of its length and is freely rotatable thereon. The lower end of this tube 64 carries a collar 66 which is journaled on the shaft 56 and also rests upon a ball thrust bearing 68, while the other face of the thrust bearing 68 rests against the hub of the wheel 52. The upper end of the tube 64 is journaled on the shaft 56 by means of a bushing 70, while added rigidity is given to the tube 64 by a third bearing 72, which is secured to the lower surface of the table 62 by means of cap screws 74.

An electric motor 76, mounted on the table 62, drives a vertical shaft 78 through conventional worm reduction gearing 80, the shaft 78 being journaled in a bearing block 82 secured to the table 62 by means of screws 84. A pinion 86 secured to the lower end of the shaft 78 drives a large gear 88 which is mounted upon the tube 64 in a position just above the table 62. Thus, when the motor 76 is energized, the tube 64 will be revolved in a counter-clockwise direction when observed from the top.

The upper portion of the tube 64 has secured thereto a wheel 90 which supports and drives a disc 92. This disc 92 is slightly smaller in diameter than the diameter of the machine and carries on its lower side near its periphery a ring 94 riveted or otherwise secured thereto. Although both the ring 94 and wheel 90 are rigidly attached to the disc 92, they are separated somewhat therefrom by bushings 96 and 98, respectively. This rivets which secure the disc 92 to the wheel 90 and ring 94 pass through the above bushings 96 and 98 and are not shown in the drawings.

The portion of the shaft 56 which extends above the tube 64 carries two rigidly attached wheels 100 and 102 which support a steel drum 104, the exterior surface of which carries a cam track which will be described presently.

A plurality, in this instance six, flat plates 106 are equally spaced around the disc 92 and extend from near the center thereof to the periphery. Only one of these plates and the parts associated therewith will be described, since all are alike.

A rectangular block 108 is secured to the end of the plate 106 and serves as a bracket to support a vertical slide guiding plate 110 which extends substantially to the top of the machine. Just inside the plate 110 a rectangular opening 112, substantially the size of the inside width and thickness of the carton to be made, extends through the plate 106 and disc 92. The two sides and back of this opening are boxed in at 114 to provide a greater bearing area for a slidable hollow chute 116 which extends through the opening 112, and is fitted thereto.

The chute 116 is secured at its top to a U-shaped yoke 118, the arms 120 of which extend forwardly and inwardly and enclose the edges of the guide plate 110. Consequently, as the chute 116 moves upwardly and downwardly, in a manner to be described, its mid section will be supported on all sides by the edges of the rectangular opening 112 and the box-like section 114, while its top portion will be held in alignment by the yoke 118 and slide guiding member 120.

The central portion of the yoke 118 is provided with an outwardly projecting roller 122 secured to the yoke 118 by a stud 124 and nut 126. The roller 122 is adjacent the drum 104 and rides on a cam track 128 secured thereto. This track is shown developed in Fig. 10. Thus, as the cam track 128 rises and falls, the cam following roller 122 moves the chute 116 upwardly and downwardly. The lower portion of the chute 116 comprises a mandrel 130 around which the carton is formed. The front and back faces of this mandrel 130 are cut away at 132, best seen in Fig. 9, so as to prevent the glue on the carton blank from sticking to the sides of the mandrel and to ease the withdrawal of the mandrel 130 from the carton after a forming operation. This is advisable, since otherwise the withdrawal of the mandrel might pull the carton from a forming head within which the carton is folded.

The above mentioned folding head is designated generally by the numeral 134, and serves to fold the flat carton blank around the mandrel 130 as the heads 134 and mandrels 130 move around the machine.

The head 134 is secured to the outward end of a horizontal arm 136 which extends toward the center of the machine, and is pivotally secured at its inner end to the disc 92 by means of a bolt 138. Just inside the point of attachment of the head 134 to the arm 136, a shallow U-shaped supporting member 140 is secured to the lower surface of the disc 92 by bolts 142, and supports the outward end of the arm 136 against downward flexure, while also allowing a definite amount of lateral movement between a stop 144 and the mandrel 130. A coil spring 146, best seen in Fig. 23, is connected between the arm 136 and the disc 92 and urges the arm 136 in a clockwise direction against the mandrel 130.

The lower surface of the arm 136 has attached thereto, at its end, a triangular bracket block 148. This block 148 supports a vertical plate 150 on the receding side of the arm 136 perpendicularly to the direction of travel of the arm as it moves around the machine. The lower portion 152 of the plate 150 is slightly offset away from the face 154 of the block 148 and is brought into abutting relation with the mandrel 130, against which it is resiliently urged by the before mentioned spring 146. This lower portion 152 is as high and as wide as the height and width of the side walls of the carton which the head is to form.

The inward edge of the lower portion 152 of the plate 150 is hinged at 155 to the edge of a second forming plate 156 which is as high as the portion 152 and slightly wider than the front or back of the carton. Another forming member 158, similar to the plate 156, is hinged at 159 along one vertical edge to the outward edges of the lower portion 152 of the plate 136.

A fourth forming member 160, which has dimensions substantially the same as a side of the carton, is hinged at 161 along one vertical edge to the outward edge of the plate 158. Thus, when the above described four rectangular plates are moved about their respective hinged joints with the free edge of the plate 156 adjacent the free edge of the plate 160, the four plates enclose the four vertical faces of the mandrel 130.

Coil springs 162, 163 and 164 are positioned around the hinge pins at 155, 159 and 161, respectively, and resiliently urge the plates or doors 156, 158 and 160 into planes parallel to the plane of the plate 152. When in this opened position, the doors 156 and 158 are restrained against further movement by L-shaped stops 165 and 166 which are attached to, or may be cast integrally with, the plate 152. For a similar purpose, the hinged side of the door 160 is provided with an outwardly projecting lug 168 which engages a block 170 on the door 158, and limits the spring driven movement of the door 160.

When the head 134 is in closed position, a snap latch 172, pivoted on a machine screw 174 secured in the face of the door 156, catches a lug 176 projecting horizontally from the free vertical edge of the door 160. This latch 172 is resiliently urged downwardly into latching position by a light coil spring 178, connected between the latch 172 and a pin or screw 180 secured in the face of the door 156. A latch releasing finger 181 projects downwardly at an angle from the latch 172 and automatically releases this latch at one point in the carton making cycle in a manner to be described subsequently.

In connection with the following description of the several camming members forming a part of the folding head 134, it should be remembered that throughout the carton forming cycle, the head moves around the machine in a counterclockwise direction past several stationary cam plates. The several folding operations are brought about by the coaction between these cam plates and the camming members on the head as the head moves past these plates.

The back of the vertical plate 152 carries a block 182 which may be formed integrally therewith. Four L-shaped arms 184, 186, 188 and 190 are hinged to the sides of this block 182 by means of pins or small rods 191 which extend into the block 182. The outward bent ends of these arms 184, 186, 188 and 190 extend toward the carton forming face of the plate 152, so that when rocked inwardly on the hinge pins 191, the ends of the arms 184 and 186 project past the top of the plate 152, while the arms 188 and 190 project past the bottom of this plate.

A leaf spring 192, positioned between the plate 152 and strips 193 and 194, which connect the arms 184 and 186 and 188 and 190, respectively, resiliently urges these arms outwardly. In the outward position the free ends of these arms are withdrawn from the plane of the carton forming surface of the plate 152. The arms 188 and 190, which project below the lower end of the plate 152, may have a strip 195 between their free ends to give greater rigidity and better wearing properties to these members. The upper arms 184 and 186 may be similarly provided with a connecting plate 196 providing the supporting plate 150 is offset sufficiently to allow complete retraction of the arms 184 and 186 from the carton forming surface of the plate 152.

The block 182 is provided with two round holes extending horizontally therethrough in which are journaled two shafts 198 and 200. The outward ends of these shafts 198 and 200 are bent at right angles into alignment with each other with their respective ends pointing in opposite directions. These outward ends are slotted at 202 and 204 in the direction of travel of the head 134 and have rollers 206 and 208, respectively, positioned in these slots. These rollers 206 and 208 are rotatively mounted on pins 210 and 212 driven crosswise through the shafts 198 and 200.

The top shaft 198 is provided with two rollers 214 and 216 which are offset somewhat from the axis thereof in the same direction as the bend in the outward end of this shaft 198. These rollers 214 and 216 rest against the arms 184 and 186, respectively, and urge the free ends of these arms inwardly past the top of the plate 152 when the roller 206 is retarded by a stationary cam during the progress of the head 134 around the machine.

The bottom shaft 200 is provided with similar rollers 218 and 220 to urge the arms 188 and 190 inwardly in the same manner as the arms 184 and 186 are urged inwardly by the rollers 214 and 216.

The plate 160 is provided with a block 222, similar to the block 182, which also has attached thereto arms 224, 226, 228 and 230 similar to the arms 184, 186, 188 and 190. The block 222 has journaled therein two bent shafts 232 and 234 carrying rollers 236 and 238, similar to shafts 198 and 200 and rollers 206 and 208, excepting that these shafts 232 and 234 are somewhat shorter than the previously described shafts. These shafts 232 and 234 also carry rollers 240, 242, 244 and 246 for a purpose similar to that provided by the wheels 214, 216, 218 and 220. These rollers, however, project from their respective shafts 232 and 234 toward each other rather than in the opposite direction as do the rollers 214, 216, 218 and 220. The reason for this is that although both sets of rollers 206 and 208, and 236 and 238 are deflected in a rearward direction by a stationary cam during the progress of the head 134 around the machine, yet the two sets of folding arms actuated by these two sets of rollers must be deflected in opposite directions toward each other. In their usual position, the arms 224, 226, 228 and 230 are urged outwardly by a flat spring 248 similar to the spring 192.

The spring urged retracting movement of the shafts 198, 200, 232 and 234 is limited by stop plates 249, which are secured to the top of the blocks 182 and 222. The offset arms, which mount the rollers 214, 218, 242 and 246, impinge against these stop plates 249 when the shafts 198, 200, 232 and 234 are in their retracted position.

Two horizontal bars 250 and 252 are hinged at one end near the hinged edge of the door 156 and are connected by a plate 254, provided with a cut-out portion 256 to clear the latch 172. These bars 250 and 252 are urged outwardly by a leaf spring 257 positioned between the connecting plate 254 and the door 156. The free ends of these bars 250 and 252 are hooked outwardly at an angle at 258 and 260, while the inward surfaces near the free ends of these bars are connected to an angle strip 262 which extends toward the free edge of the door 156. Thus, when the bars 250 and 252 are pushed inwardly against the pressure of the spring 257, the edge of the angle piece 262 will project past the carton forming surface of the door 156.

Each of the doors 156 and 158 is provided at its top and bottom with a small hinged flap 264, 266, 268 and 270. These flaps are slightly less in height and width than the thickness and width, respectively, of the carton to be manufactured, so that whenever any one of these flaps is bent over at right angles, it will nearly cover one end of the rectangular opening formed when the head 134 is in closed position.

Outside each of the flaps 264, 266, 268 and 270 is hinged a second heavier flap 272, 274, 276 and 278, respectively. These flaps 272, 274, 276 and 278 are resiliently urged into vertical positions by coil springs 280, 282, 284 and 286, respectively. Each of these outside flaps 272, 274, 276 and 278 carries a cam 288, 290, 292 and 294, respectively, the camming surface of which spirals around the axis of rotation of the flap, so that when the head 134 passes a stationary roller that engages these cams, the pressure of the roller on the cams will cause the flaps to be folded over into a horizontal position against the torsional stress of the springs 280, 282, 284 and 286. The inner flaps 264, 266, 268 and 270 are loosely attached to the outer flaps 272, 274, 276 and 278 by means of rivets 296 secured to the inner flaps and sliding in vertical slots 298 in the outer plates. Thus, as the outer flaps are actuated by the cams 288, 290, 292 and 294, the inner flaps are forced to move a substantially equal amount.

The outer flap 276 is provided with a roller 300, rotatively secured thereto by a bracket 302. This roller 300 projects perpendicular to the bottom surface of the flap 276, and is in the plane of travel of the head 134. The purpose of this roller 300 will appear subsequently in this specification.

Each of the doors 156 and 158 carries two outwardly projecting rollers 304 and 306, and 308 and 310, respectively. These rollers 304, 306, 308 and 310 are mounted on vertical axes, and at one point in the travel of the head 134 around the machine they coact with camming bars, soon to be described, and force the doors 156 and 158 into a parallel position.

Figure 2:
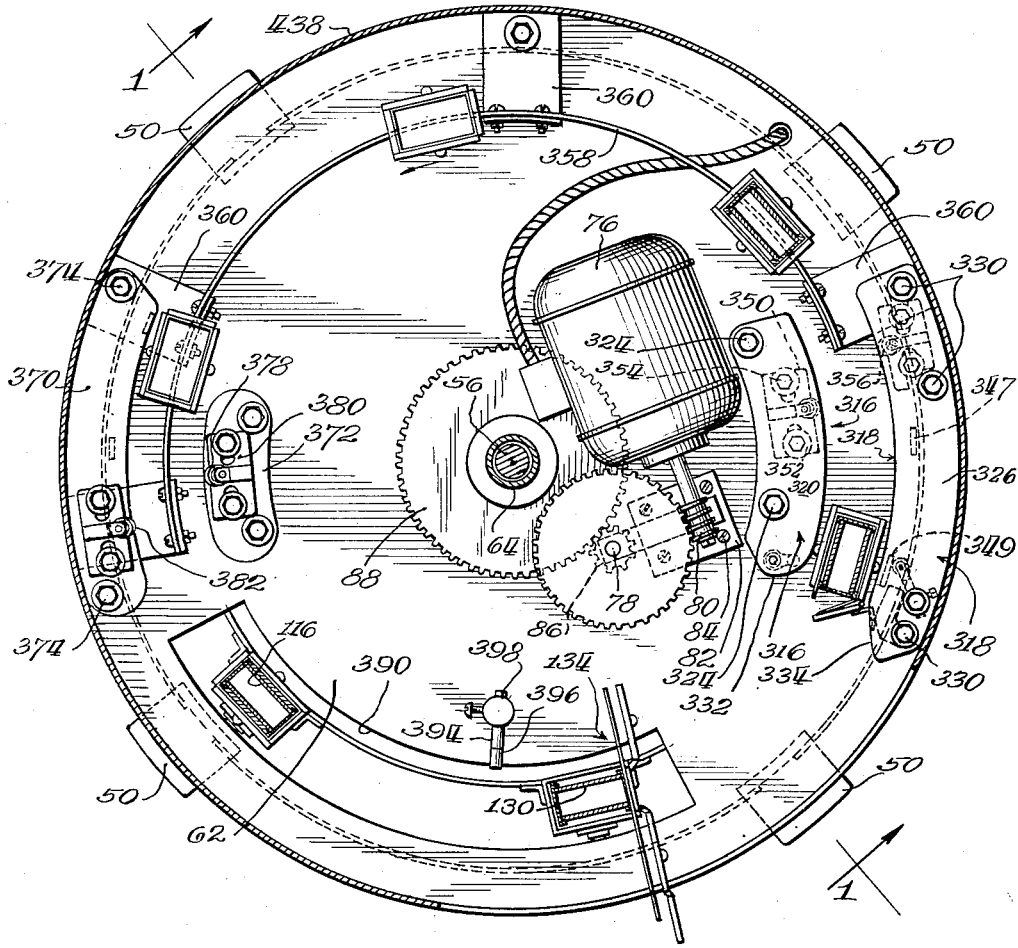
Fig. 2 is a transverse sectional view of the machine, taken in the direction of the arrows along the line 2—2 of Fig. 1.

Although the machine is cylindrical in shape, for clearness of understanding in the description of the movement of the head, the bottom of Fig. 2 will be taken as the front of the machine. In Fig. 10 the letter "F" designates the front.

As the head 134 aend mandrel 130 move together from the front of the machine toward the right, the head 134 is open as shown in Fig. 22. At this point a feeder, not shown or described, since it forms no part of this invention, pushes the head 134 away from the mandrel 130, against the tension of the spring 146, as shown in Fig. 22a. The feeder then introduces a scored carton blank properly coated with adhesive, as shown in Fig. 11, between the mandrel 130 and head 134, and allows the spring 146 to draw the mandrel 130 and head 134 together, as shown in Fig. 22.

Thus, the blank is clamped with its face 312 between the mandrel and head with a bottom score line 314 slightly below the lower end of the mandrel 130, Fig. 11.

As the head 134 and mandrel 130 move to a point approximately one-fifth the distance around the machine from the front, the head 134 comes into contact with two sets of cam plates, 316 on the inside and 318 on the outside. The set of cam plates 316 consists of two separate and similar plates 320 and 322 which are supported upon pillars 324. These plates 320 and 322 are separated from each other and from the table 62 by distances equal to the distance separating the rollers 308 and 310 from each other and from the table 62. The other set of cam plates 318 is similarly composed of two separate plates 326 and 328 supported on pillars 330 and spaced in a manner substantially the same as the plates 320 and 322.

The curvature of the contiguous surfaces of the two sets 316 and 318 is such that with the rollers 304, 306, 308 and 310 in contact with the plates 320, 322, 326 and 328, the doors 156 and 158 will be forced into a parallel position.

The noses at 332 and 334 of the cam sets 316 and 318, respectively, are rounded off away from each other, so as to make the entrance of the head 134 into the space between these cams smoother and, therefore, quiter and less strenuous on the machine.

As the head 134 moves into position at the entrance between the cams 316 and 318, the doors 156 and 158 bump the noses of these cams and are swung toward a parallel position. In this position the rollers 308 and 310 are guided on the plates 326 and 328, respectively, while the arms 250 and 252 impinge on two rollers 336 which are mounted respectively on the lower surface of plate 320 and upper surface of plate 322. These rollers 336 may be secured to the cam plates 320 and 322 by means of bolts 338 and short offsetting arms 340, which enable adjustment of these rollers 336 with respect to the edge of the plates 320 and 322. The head 134 is shown in this position in Fig. 24.

Fig. 25 shows the head 134 slightly advanced from the position shown in Fig. 24. Here the two side doors 156 and 158 have been folded parallel and against the sides of the mandrel 130. In this position the rollers 304 and 306 have come into contact with the cam tracks 320 and 322 and the bars 250 and 252 have moved farther along the rollers 336. Also note that in this position a lip 342, which curves outwardly from the stop 168 on the door 160, rides against an L-shaped block 344 secured to the forward pillar 330, and pushed the door 160 partially closed. In this position the carton appears as illustrated in Fig. 12 excepting that the end flap is partially folded.

In Fig. 26 after a slightly further advance of the head 134, the outwardly hooked ends 258 and 260 of the bars 250 and 252 ride past the rollers 336. This pushes these bars 250 and 252 inwardly and causes the strip 262 to fold the narrow vertical carton flap across the edge of the mandrel 130.

In Fig. 27 the ends of the bars 250 and 252 have passed the rollers 336, thereby allowing these bars and their attached strip 262 to spring outwardly and permit a roller 346 carried by an arm 348, adjustably mounted in a post 350, to impinge against the lip 342 and push the door 160 closed. In the closed position the door 160 is secured by the snap latch 172, as previously described. Thus, the four large walls of the carton are folded and the side seam glued. The carton now appears as in Fig. 13.

As the head 134 moves slightly farther along its path, two raised portions 347 and 349 on the upper surface of the cam plate 328 impinge against and raise the rollers 208 and 238, respectively, thus causing the L-shaped arms 188, 190, 228 and 230 to move inwardly in a manner previously described. This inward movement of these arms 188, 190, 228 and 230 tucks the two bottom edge carton flaps across the end of the mandrel 130, as shown in Figs. 14 and 28. As the head 134 advances slightly, the rollers 208 and 238 drop off the cam blocks 347 and 349 and allow the arms 188, 190, 228 and 230 to spring back into their retracted position, as shown by the broken line in Fig. 28. The carton now appears as in Fig. 14.

An additional movement of the head 134 brings it into the position shown in Fig. 29. Here a roller 350, which projects downwardly at approximately 45 degrees from a block 352, is adjustably secured to the lower surface of the same plate 322, by means of bolts 354. This roller 350 engages the cam 294 and as the head passes, the cam 294 is revolved, thereby moving the plates 278 and 270 into a substantially horizontal position, thus folding the back bottom carton flap into position, as shown in Fig. 15.

After the cam 294 passes the roller 350, the cam 294 and flaps 278 and 270 are returned to their retracted position. At this point the cam 292 engages a roller 356 which is mounted on the cam plate 328 in a manner similar to the mounting of the roller 350 on the cam plate 322. Thus, the cam 292 and flaps 276 and 268 are revolved, and the last remaining bottom carton flap folded into position. Just before the cam 292 drops off the roller 356, the roller 300 runs on to a track 358 which extends from this point on, approximately half way around the machine. This track 358 is supported at intervals on brackets 360 which are bolted to the table 62. The top of the track 358 is at such a height that the roller 300 running thereon, keeps the flaps 276 and 268 in a horizontal position, thereby holding the last folded bottom flap in position and supporting the bottom of the carton.

After the roller 300 engages the track 358, the material to be packaged, such for instance as granulated sugar, is introduced in a measured amount into the top of the hollow chute 116. The device that measures out the proper amount of material and dumps it into each successive chute as it reaches the proper point is not here shown or described, since it forms no part of this invention.

The sugar, or other material, fills the hollow mandrel 130 and a portion of the chute 116. At this point the cam following roller 122, attached to the yoke 118, starts up an inclined portion 362 of the cam track 128, Fig. 10, thus causing the chute 116 and mandrel 130 to move upwardly and be partially withdrawn from the carton. After a short rise, a dipped portion 364 of the track 128 causes the chute and mandrel to move downwardly slightly and thus settle or pack the material in the carton. A second short cam track 366 parallels the main track 128 at this dipped point and thereby exerts positive downward pressure on the chute 116 and mandrel 130 if the weight of the mandrel and chute should be insufficient to produce the desired packing.

This upward and downward movement is repeated by the chute 116 and mandrel 130 until the roller 122 reaches a high level portion 368 of the track 128. At this point the material has been completely deposited within the carton, and the bottom of the mandrel 130 is slightly above the tops of the flaps 272 and 274.

The head 134 now having reached a position approximately two-thirds of the distance around the machine, it passes between two horizontal plates 370 and 372, which are supported on pillars 374 in a manner similar to that in which cam groups 316 and 318 are supported. These plates 370 and 372 support camming members to be described, but do not necessarily touch the rollers 304 and 308 on the doors 156 and 158, respectively.

Two cams 374 and 376, similar to the cams 347 and 349, are attached to the lower surface of the outside plate 370. These cams depress the rollers 206 and 236, respectively, and cause the inner top flaps of the carton to be folded inwardly in the same manner as cams 346 and 348 cause the folding of the bottom inner flaps, Figs. 31 and 16.

As the head 134 advances slightly farther, a roller 378, supported in a block 380, similar to the block 352, and secured to the upper surface of the inner plate 372, engages the cam 290. This roller 378 causes a rotation of the cam 290 and a consequent folding of one of the carton top flaps in the same manner that the roller 350 and cam 294 fold the bottom flap. See Figs. 32 and 16.

On the outside plate 370, another similar roller 382, acting in a similar manner on the cam 288, closes the last remaining carton flap after a slightly further advance of the head 134.

As the cam 288 passes the roller 382, the flaps 272 and 264 return to their retracted position, while the roller 300, at approximately the same time, runs off the end of the track 358, thereby allowing the flaps 276 and 268 to spring outwardly. Simultaneously the head 134 and chute 116 have reached such a point that the roller 122 starts down a dip 384 in the cam track 128. This dipped portion 384 is paralleled by another cam strip 386 which acts in the same manner as the strip 366. As the chute 116 is caused to move downwardly by the coaction of the above-mentioned roller 122 and cam tracks 384 and 386, the bottom of the mandrel 130 engages the top of the finished carton and urges it downwardly. Thus, when the roller 122 has reached the bottom 388 of the tracks 384 and 386, the carton will have been ejected, from the bottom of the head 134, through a slot 390 in the table 62.

In order to insure ejection of the carton, the bottom 388 of the dipper portion 384 of the track 128 is somewhat below the long horizontal portion. Therefore, the track 128 is provided with a sharp rise 392 to bring the mandrel 130 back to this carton forming position.

Just after the head 134 has passed the sharp rise 392 in the track 128, it moves abreast of an outwardly projecting horizontal rod 394, Figs. 19 and 20, carrying a small roller 396 at its outward end. This rod 394 is secured in a post 398 which is attached to the table 62. As the head 134 moves past the rod 394, the roller 396 engages and raises the latch release 181, thus lifting the latch 172 and allowing the doors 156, 158 and 160 to spring outwardly as previously described. At this point the head 134 has reached the front of the machine and is ready for another cycle, beginning with the feeding of another carton blank.

Below the table 62 a tube 400 surrounds the drive tube 64 and is secured thereto by a plurality of set screws 402. Upper and lower horizontal angle iron rings, 404 and 406, respectively, are attached to this tube 400 by means of triangular gusset plates 408, welded to discs 410 and 412 which in turn are welded to the rings 404 and 406, respectively. Therefore, as the tube 64 revolves, it carries with it the angle iron rings 404 and 406, which revolve at the same speed as the heads 134 and mandrels 130.

Below the table 62 and directly beneath the mandrel 130 is a rectangular carton receiving sleeve 414 which has inside dimensions substantially equal to the width and thickness of the carton, thereby providing a close fit between the two. This sleeve 414 is slidable vertically and is secured near its top to the outside of the ring 404 by means of a yoke 416 which may be welded, bolted, or otherwise suitably secured to the ring 404. The lower ring 406 also carries a yoke 418 which surrounds the sleeve 414 with a sliding fit. Thus, as the rings 404 and 406 revolve, the sleeve 414 is carried along, but has freedom of motion relative thereto in a vertical direction. The downward movement of the sleeve 414 is limited by a lug 420 which is attached to the sleeve 414, and rests upon the top edge of the yoke 418 when the sleeve 414 is in its lownward position.

The outward face of the sleeve 414 is provided with a roller 422 which rides upon a cam track 424 which is attached to the inside face of the legs 50 of the machine by screws 426 and spacing washers 428. The configuration of this cam 424 is shown developed in Fig. 10. It will be noticed that as the sleeve 414 and mandrel 130 approach the front of the machine, and as the mandrel 130 moves downwardly to eject the carton as previously described, an upward inclination 430 of the cam track 424 causes the sleeve 414 to move upwardly through the slot 390 in the table 62. As will be seen in Fig. 10, the sleeve 414 reaches its highest point at substantially the same time the mandrel 130 reaches its lowest level, and that in arriving at this point, the carton has been transferred to the sleeve 414, with the top of the carton substantially flush with the top end of the sleeve 414. As the sleeve 414 moves on from the carton transferring position, a descending portion 432 of the track 424 brings the sleeve 414 back to its retracted position, with the stop 420 against the yoke 418. At this descending portion 432 the upper surface of the cam 424 is paralleled by a second short cam 434 which insures the positive downward motion of the sleeve 414.

Each of the sleeves 414 is of such length that it can contain five cartons, with the top of one carton substantially flush with the top of the sleeve 414, while the bottom of the fifth carton is substantially flush with the bottom of the sleeve. Thus, when the sleeve 414 rises and receives a newly manufactured carton, the downward movement of the new carton will eject the fifth carton from the bottom of this sleeve. The cartons form a close frictional fit with the stacks, so that the cartons will not fall therefrom until pushed.

A flat S-shaped spring 435 is secured at one end to the top surface of the disc 410. Its opposite end rests upon the top of the upper carton in the sleeve 414 when this sleeve is in its retracted position, and thus holds the top flap of the carton in place, Fig. 1. When the sleeve 414 is pushed upwardly to receive a new carton, this spring 435 is bent backwardly by the movement of the sleeve 414, and is thus out of the way of the new carton, as shown in Fig. 3.

As shown in Fig. 3, these completed cartons may be ejected upon an endless belt conveyor 436, of well known design, which removes the cartons from the vicinity of the machine.

To give the machine a more finished appearance and to exclude dust, the top portion above the table 62 is preferably enclosed by a cover 438, the top of which may rest upon the upper edge of the stationary drum 104. The front portion of this cover 438 should have an opening to accommodate the doors 158 and 160 which in this position are opened to receive a carton blank, while the top of the cover 438 should be provided with a slot, not shown, through which the material to be packaged may be introduced into the chute 116.

The lower portion of the machine may have an annular ring 440 which rests upon the base 52, and a drum 442, slightly smaller in diameter than the inside diameter of the ring 440, which is secured to the angle iron ring 406. The ring 440, drum 442 and disc 412 thus cooperate to prevent dust from entering the machine from the floor. Also, the lower portion of the machine may be enclosed by a shell 444, attached to the outward faces of the legs 50, excepting for an opening in the front to accommodate the endless belt conveyor 436.

In operation, the carton blanks are printed with glue in a well known manner and fed between the mandrel 130 and head 134. As the heads 134 travel around the machine, the blanks are folded into cartons and filled with whatever material is to be packaged. The tops of the cartons are then closed and the filled and sealed carton is pushed into the sleeves 414. Since the sleeves 414 hold five cartons, it will be seen that each carton is securely held within the sleeve 414 for five revolutions, thereby allowing time for the glue to set properly. Therefore, when finally the completed carton is ejected on to the conveyor 436, it is in rugged condition and well able to endure subsequent rough handling, without danger of any of the glued joints separating.

Although the carton making and filling machine herein described is perfectly adapted to use prescored carton blanks of the usual type, the fact that it folds the complete carton from a flat blank, instead of starting from a tube as do other machines, enables a modified blank to be utilized. This modified blank produces a stronger carton having better glue seals between the inner and outer top and bottom flaps than is usual with the machines ordinarily used. Ordinarily the carton blank is scored, as at 445, from the side that is to be on the outside of the finished carton. In Fig. 34 a portion of a carton blank so scored is illustrated. When one of these blanks is folded, as shown in Fig. 35, the depression formed on the outside of the blank is straightened out, as at 446, while the hump on the inside becomes still more bowed, as at 448, and of looser texture because of the separation of the laminations within the cardboard. Because of the separation of these laminations the corner is weakened. Thus, when the top inner flaps of a carton using this blank are folded, the folds do not exert any very strong tendency to push these flaps outwardly against the subsequently folded outer flaps and, therefore, the glue bond between the inner and outer flaps is very likely to be defective.

The reason for the use of the above type of scoring is that it allows the tube blank (a flat blank that has been folded into a rectangular tube and has had the side seam glued) to be folded flat without bursting the corner, Fig. 36. This 180 degree fold is necessary in order that the tube blanks may be economically shipped to the packager.

The carton blank shown in Fig. 37 is scored at 450 on the surface of the blank that is to become the inside of the carton, and is the type of blank that I prefer to use with the above described machine. When this blank is folded along the score lines 450, the fold appears as in Fig. 38. In this fold the hump on the outside of the carton blank is drawn tightly around the corner, while the edges of the depression 450 on the inside of the blank are forced together, thereby forming shoulders 452 which tightly compress the laminations in the corner and exert a strong tendency to push the flaps away from the 90 degree position. Thus, the inside flaps are pushed against the glue on the outside flaps with much greater force than can be obtained when using a conventionally scored blank. This inside scored blank cannot be used successfully, however, on the usual type of carton machine, since a tube made from this blank cannot be folded flat without bursting the corners, because of the great compression of the laminations at this point.

It should be understood that although my invention has been described in connection with a specific embodiment thereof, I contemplate that departures may be made therefrom without departing from the scope of this invention.

Having thus described my invention, what I claim as new and desire to secure by United States Letters Patent is:

1. In a device of the class described, a hollow mandrel, a folding head associated therewith, said head comprising a plurality of articulated plates, means to fold said head about the sides of said hollow mandrel, and means to move the mandrel axially in and out of the top of said folding head.

2. In a device of the class described, a mandrel, a folding head associated therewith, means to fold said head to form a box around the sides of said mandrel, and means to move said mandrel in and out of said folding head while the head is folded to form a box.

3. In a device of the class described, the combination comprising: a hollow mandrel, a folding head associated therewith, said head and mandrel being in continuous movement; means to operate said head to fold the sides and bottom of a carton from a cardboard blank; means to fill said carton through said hollow mandrel, means to operate said head to close the top of said carton, and means in association with said hollow mandrel to eject the carton from said folding head.

4. In a device for forming cartons from a flat blank, the combination comprising: a plurality of sets of inner and outer forming members, said inner and outer members being separable to receive a flat blank, means for moving said sets continuously, means for operating the outer member to enclose said mandrel and form the blank therearound, and means to fill the carton through the inner member.

5. In a device for forming and filling cartons, the combination comprising: a plurality of sets of inner and outer forming members, said inner and outer members being separable to receive a flat blank, means for operating the outer member to surround the inner member and form the blank around the inner member, and means to fill said carton before returning the outer forming member to its original position.

6. In a device for forming and filling cartons, the combination comprising: inner and outer forming members, means to introduce a carton blank between said members, means for operating the outer member to form the blank around the inner member, means to fill the carton through the inner member, and means to operate the outer member to seal the filled carton.

7. In a device for forming and filling cartons, the combination comprising: inner and outer forming members, means to operate the outer member to form a carton blank around the inner member, means to withdraw the inner member from the outer member, means to operate the outer member to seal said carton, and means to operate the inner member to force the carton from the outer member.

8. In a device for forming and filling cartons, the combination comprising: an inner forming member, an outer forming member contiguous thereto, the inner and outer forming members being separable to receive a flat blank therebetween, means for moving said inner and outer forming members continuously, means for operating the outer member to enclose the inner member and form a carton from said blank, means for filling said carton, means for sealing the top of said carton, and means to eject the formed, filled and sealed carton from the device.

9. In a device for forming and filling cartons, the combination comprising, an inner forming member, means for forming a glue sealed carton around said inner member, means to fill said carton through said inner member, means to seal said carton, means to retain said carton under pressure until the glue sets, means to support the outer surfaces of the side walls of the carton while it is being sealed, and means coacting with said inner forming member to eject the completed carton.

10. In a device of the class described, the combination comprising: a hollow inner forming member, means to form a glue sealed carton around said inner member, means to retain said carton under pressure until the glue partially sets, and means longitudinally to reciprocate said inner forming member to eject said carton.

11. In a device of the class described, a mandrel, a folding head adapted to fold around said mandrel, means to move said head laterally from said mandrel, and means to reciprocate said mandrel longitudinally in and out of said head.

12. In a device for forming cartons, the combination comprising: a mandrel, a folding head associated therewith and adapted to fold a carton around said mandrel, a tube to receive said carton and retain it under pressure until its adhesive sets, and means to reciprocate said tube.

13. In a device for forming cartons, the combination comprising: a mandrel, a folding head associated therewith and adapted to fold a carton around said mandrel, means to hold said mandrel stationary with respect to said head while said carton is being formed, a sleeve to retain said carton under pressure until its adhesive sets, and means coacting with said mandrel to eject said carton from said folding head and into said sleeve.

14. In a device for forming cartons the combination comprising: a foldable head, means to fold said head to form a hollow rectangular parallelepiped, a mandrel, means to hold said mandrel stationary with respect to said head while said carton is being formed, and means to reciprocate said mandrel in and out of said head.

15. In a device for forming cartons, a plurality of sets of inner and outer forming members, said sets being in continuous movement, said inner and outer forming members adapted to be separated to receive a carton blank therebetween, cams to operate said outer member to fold the blank around said inner member and to close the bottom of said carton, cams to withdraw the inner member, means to close the top of said carton, sleeves to receive the cartons from said sets, and means to transfer said cartons from said sets to said sleeves.

16. In a device for forming cartons, a plurality of sets of inner and outer forming members, said sets being in continuous movement, said inner and outer forming members adapted to be separated to receive a carton blank therebetween, cams to operate said outer member to fold the blank around said inner member and to close the bottom of said carton, cams to withdraw the inner member, means to close the top of said carton, sleeves to receive the cartons from said sets, means to transfer said cartons from said sets to said sleeves.

17. The method of forming cartons which comprises, folding a carton blank around a hollow mandrel, closing the bottom of said carton, filling the carton through the hollow mandrel as the mandrel is being withdrawn from the carton, closing the top of said carton after the withdrawal of said mandrel, and supporting the outside surfaces of said carton while the top is being closed.

18. In a device for forming cartons, the combination comprising: a vertical rotatable element, inner forming members spaced from and driven by said rotatable element, outer forming members contiguous to said inner forming members and driven by said rotatable element, said inner and outer forming members being separable to receive a flat blank, cams to fold said outer member to form a box around said inner member, means to withdraw the inner member from said carton while the outer member forms a box around said inner member, and means to open said box after the withdrawal of said inner member.

19. In a device for forming and filling cartons, the combination comprising: a hollow inner forming member, an outer forming member, a sleeve; means to move said inner and outer members and said sleeve together at a substantially uniform velocity, said outer forming member being separable from said inner member to receive a carton blank therebetween, means to operate said outer forming member to fold said blank around said inner member, means to close the bottom of the carton, means to withdraw said inner member from said carton, means to close the top of said carton, and means to operate said inner forming member to force said carton from said outer forming member into said sleeve.

20. In a device of the character described, the combination comprising: a form adapted to have a carton folded therearound, means to move said form continuously, a plurality of articulated plates, means to move said plates with said form, means to fold said plates to surround said form, and means to fill said carton while withdrawing said form.

21. In a carton making and filling device, a continuously moving form, automatic means to form the sides and bottom of a carton around said form, means to fill said carton while withdrawing said form, means to close the remaining opening of said carton after the withdrawal of said form, and means to support the outside surfaces of said carton while the said remaining opening is being closed.

22. In a device for forming cartons from a flat sheet, the combination comprising: a plurality of forming members, mounting means whereby said forming members are relatively movable to and from carton blank receiving and forming positions, automatic means to form said carton blanks into cartons, means to fill said cartons, means to seal the tops of said cartons, means to support the side walls and bottom walls of the cartons while the tops are being sealed and means to hold said cartons under pressure until their adhesive sets.

23. In a carton folding machine, the combination comprising: a vertical inner forming member, an outer forming member consisting of a plurality of articulated plates, means to move said inner and outer forming members continuously to form the sides and bottom of a carton around the inner member, means to withdraw said inner member upwardly, means to fill said carton, automatic means to close the top of said carton, a vertical stack below said inner forming member, means to move said inner member downwardly to force said carton into the top of said stack, and the movement of said carton into said stack forcing an earlier manufactured carton from the bottom of said stack.

24. In a device of the class described, the combination comprising: an inner forming member, an outer forming member, means to operate the outer forming member to fold a carton around the inner member, a stack below the inner forming member, means to force the folded carton toward said stack, and means to raise said stack to receive said carton.

25. In a device for forming cartons from a flat blank, the combination comprising: an inner forming member, an outer forming member, means to operate the outer forming member to fold a carton around the inner member, means below the inner forming member to hold newly folded cartons under pressure while the adhesive is setting, means to force the folded carton toward said means below the inner forming member, and means to raise said means below the inner forming member to receive said folded carton.

26. In a machine of the class described, a mandrel, a folding head associated therewith, means to fold said head to enclose the sides of said mandrel, means to project a portion of said head across an end of said mandrel while the mandrel is enclosed in said head, and means to withdraw the mandrel from the head while the head is folded.

27. In a machine for forming and filling cartons, the combination comprising: a mandrel, a folding head associated therewith and adapted to form a box around said mandrel to fold a carton, means to fill said carton, means to seal said filled carton, a receptacle below said folding head adapted to receive said sealed carton, means to force the sealed carton from the folding head into said receptacle, and means to open said box after the carton has entered said receptacle.

28. In a machine for forming and filling cartons, the combination comprising: an inner forming member, an outer forming member adjacent thereto, means to move said members endlessly past a plurality of stationary cams, means to reciprocate the inner forming member within the outer forming member, said combination being adapted to receive a flat carton blank, manufacture a carton therefrom, fill said carton, close and seal the top of said carton, and eject said formed, filled and sealed carton.

29. In a machine for forming and filling cartons, the combination comprising: inner and outer forming members, means to operate the outer member to form a carton blank around the inner member, means to withdraw the inner member from the outer member, and means to operate the outer member to seal said carton after the removal of said inner member.

30. In a machine for forming and filling cartons, the combination comprising: an inner forming member, an outer forming member adjacent thereto, means to introduce a carton blank between said members, means for operating the outer member to fold the blank around the inner member, means to operate the outer member to form the bottom of said carton, means to fill the carton through the inner member, means to withdraw the inner member from the outer member, and means to operate the outer member to close the top of said carton.

31. In a device for forming and filling cartons, the combination comprising: inner and outer forming members, means to move said members together, means to separate said members for the introduction of a carton blank therebetween, means for operating the outer member to fold the carton blank around the inner member, means to withdraw the inner member from the outer member, means to operate the outer member to close the top of the carton after the withdrawal of the inner member, and means to operate the inner member to eject the closed carton from the vicinity of the outer member.

32. In a device of the class described, the combination comprising: a hollow inner forming member, means to form a glue sealed carton around said inner member, means to retain said carton under pressure until the glue partially sets, said retaining means comprising a tube below said head into which the newly finished carton is projected, and out of which the carton is ejected after the glue has set.

33. The method of forming and filling cartons which comprises, wrapping an articulated folding head around a hollow mandrel with a carton blank between the mandrel and the head, closing the bottom of the carton, filling the carton through the hollow mandrel as the mandrel is being withdrawn from the carton, closing the top of the carton after the withdrawal of the mandrel, and moving the mandrel to eject the finished carton from the folding head.

34. In a carton making and filling device, a continuously moving form, automatic means to form the sides and bottom of a carton around said form, the last said means comprising an articulated folding head adapted to be wrapped about said form, means to fill said carton while withdrawing said form, means to close the remaining opening of said carton after the withdrawal of said form, means to reinsert the form into said head to force the finished carton therefrom, and means to unwrap said head from around said reinserted form.

35. In a device of the class described, a mandrel, a folding head associated therewith, means to fold said head to form a box around the sides of said mandrel, and means to move said mandrel out of said folding head while the head is folded to form a box.

FRANK D. PALMER.